United States Patent
Sun

(10) Patent No.: US 8,257,642 B2
(45) Date of Patent: Sep. 4, 2012

(54) METHOD FOR FORMING A CHAIR

(75) Inventor: Chun-Hsia Sun, Lugang Township (TW)

(73) Assignee: Ching-Ching Trading Co., Changhua County (TW)

( * ) Notice: Subject to any disclaimer, the term of this patent is extended or adjusted under 35 U.S.C. 154(b) by 288 days.

(21) Appl. No.: 12/697,204

(22) Filed: Jan. 29, 2010

(65) Prior Publication Data
US 2011/0187020 A1 Aug. 4, 2011

(51) Int. Cl.
*B29C 49/04* (2006.01)
(52) U.S. Cl. ............... 264/516; 264/259; 264/271.1; 264/273; 264/274; 264/523; 264/534; 264/540
(58) Field of Classification Search .............. None
See application file for complete search history.

(56) References Cited

U.S. PATENT DOCUMENTS 3,669,496 A * 6/1972 Chisholm ............... 297/448.1
5,755,489 A * 5/1998 Rossman et al. ............ 297/338

OTHER PUBLICATIONS

Lee, Norman C.. Practical Guide to Blow Molding. Shrewsbury, UK: 2006. pp. 7-8.*

* cited by examiner

*Primary Examiner* — Monica A Huson

(57) ABSTRACT

The method of an embodiment of the present invention comprises the following steps: (A) filling a melted thermoplastic material for a first time; (B) closing the forming mold and blowing air into the forming mold; (C) opening the first forming mold and removing the chair legs; (D) placing at least two of the chair legs into a second forming mold; (E) filling the melted thermoplastic material for a second time; and (F) closing the second forming mold and blowing air into the second forming mold.

12 Claims, 12 Drawing Sheets

METHOD FOR FORMING A CHAIR

BACKGROUND OF THE INVENTION

1. Field of the Invention

The present invention relates to a method of forming a chair, and more particularly to a method of forming a chair which is able to form both the chair legs and the seat together.

2. Description of the Related Art

Currently, most of chairs are composed of chair legs and the seat, and the seat comprises a chair pad and a chair back. The chair legs and the seat respectively have matching securing apertures. After the chair legs and the seat are separately formed, these two items are combined with screws.

However, since the chair legs and the seat are individual elements and combined together with screws, the securing strength may be weak. In addition, shaking and vibrations that occur during usage may cause the screws to loosen. Furthermore, after the chair legs and the seat are separately formed, they must be combined together with screws, which can lead to longer manufacturing times and increased costs.

Therefore, it is desirable to provide a method of forming a chair to mitigate and/or obviate the aforementioned problems.

SUMMARY OF THE INVENTION

An objective of the present invention is to provide a method of forming a chair which is no need for other securing elements and thus manufacturing costs and times are reduced.

Another objective of the present invention is to provide a method of forming a chair which is very durable and worry-free with respect to screws In order to achieve the above-mentioned objectives The method of an embodiment of the present invention comprises the following steps: (A) filling a melted thermoplastic material for a first time; (B) closing the forming mold and blowing air into the forming mold; (C) opening the first forming mold and removing the chair legs; (D) placing at least two of the chair legs into a second forming mold; (E) filling the melted thermoplastic material for a second time; and (F) closing the second forming mold and blowing air into the second forming mold. Wherein: (A) filling a melted thermoplastic material for a first time; wherein the thermoplastic material is melted by a blow molding machine and vertically pulls a plastic strip to fill an open first forming mold; and the first forming mold compries plural matching molds and has an internal first mold cavity and a first blow hole externally reaching into the mold cavity; (B) closing the forming mold and blowing air into the forming mold; wherein the molds of the first forming mold are closed together to cut off and seal the plastic strip in the first forming mold, and one end of the blow hole passes through the plastic strip and is used for blowing the plastic strip to expand the plastic strip to conform to the shape of the mold cavity and form chair legs after a cooling and hardening processes; (C) opening the first forming mold and removing the chair legs; wherein the chair legs are removed from the first mold, and the chair legs have an arc shape and a securing portion with a plurality of through apertures; (D) placing at least two of the chair legs into a second forming mold, the second forming mold also comprising plural matching molds, one of the molds having a space for accepting leg portions of the chair legs such that the chair legs are partially disposed within the mold; (E) filling the melted thermoplastic material for a second time; wherein the thermoplastic material is melted by the blow molding machine and vertically pulls the plastic strip to fill the second forming mold, the second forming mold also has a second mold cavity and a second blow hole; (F) closing the second forming mold and blowing air into the forming mold; wherein the molds of the second forming mold are closed together to cut off and seal the plastic strip in the second forming mold, one end of the blow hole passes through the plastic strip and is used for blowing the plastic strip to expand the plastic strip to fit the shape of the mold cavity and form chair legs after a cooling and hardening processes; and during the blowing process, the plastic strip completely covers the securing portion of the chair legs to provide friction and extra plastic material permeates the through apertures expand to a stop edge, such that the seat and the chair legs engage together; and (G) completing the chair, wherein after opening the second forming mold, a finished chair is obtained.

With the above mentioned method, the following benefits can be obtained: 1. when the seat is formed, the engagement between the chair legs and the seat is also formed to complete the chair; therefore, there is no need for other securing elements and thus manufacturing costs and times are reduced. 2. When the seat is formed, with the stopping edge, the chair legs and the seat obtain multiple points of securing strength which makes the chair very durable and worry-free with respect to screws.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
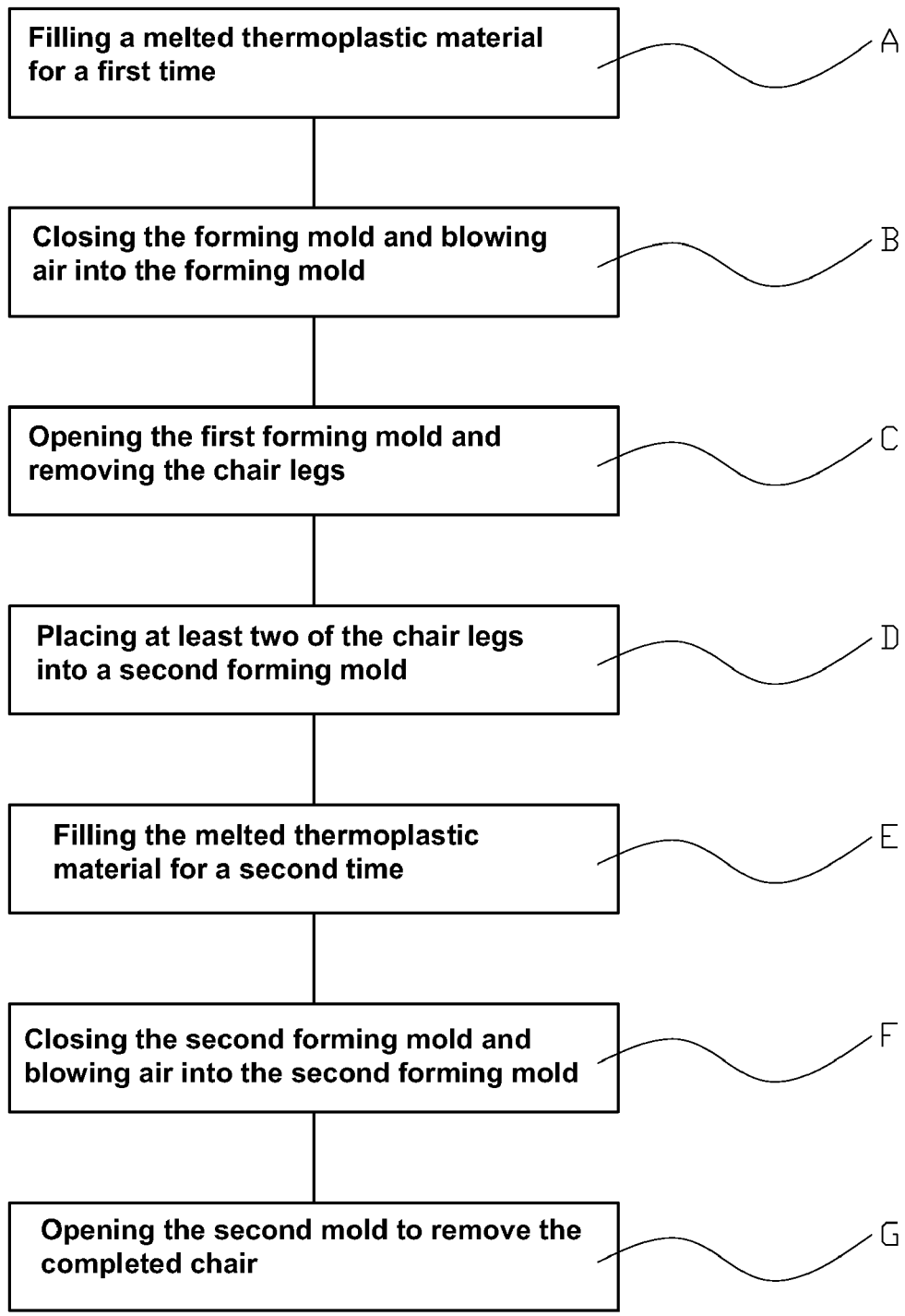
FIG. 1 is a flow chart of an embodiment of the present invention.

Please refer to FIG. 1. The method of an embodiment of the present invention comprises the following steps: (A) filling a melted thermoplastic material for a first time; (B) closing the forming mold and blowing air into the forming mold; (C) opening the first forming mold and removing the chair legs; (D) placing at least two of the chair legs into a second forming mold; (E) filling the melted thermoplastic material for a second time; and (F) closing the second forming mold and blowing air into the second forming mold.

Figure 2:
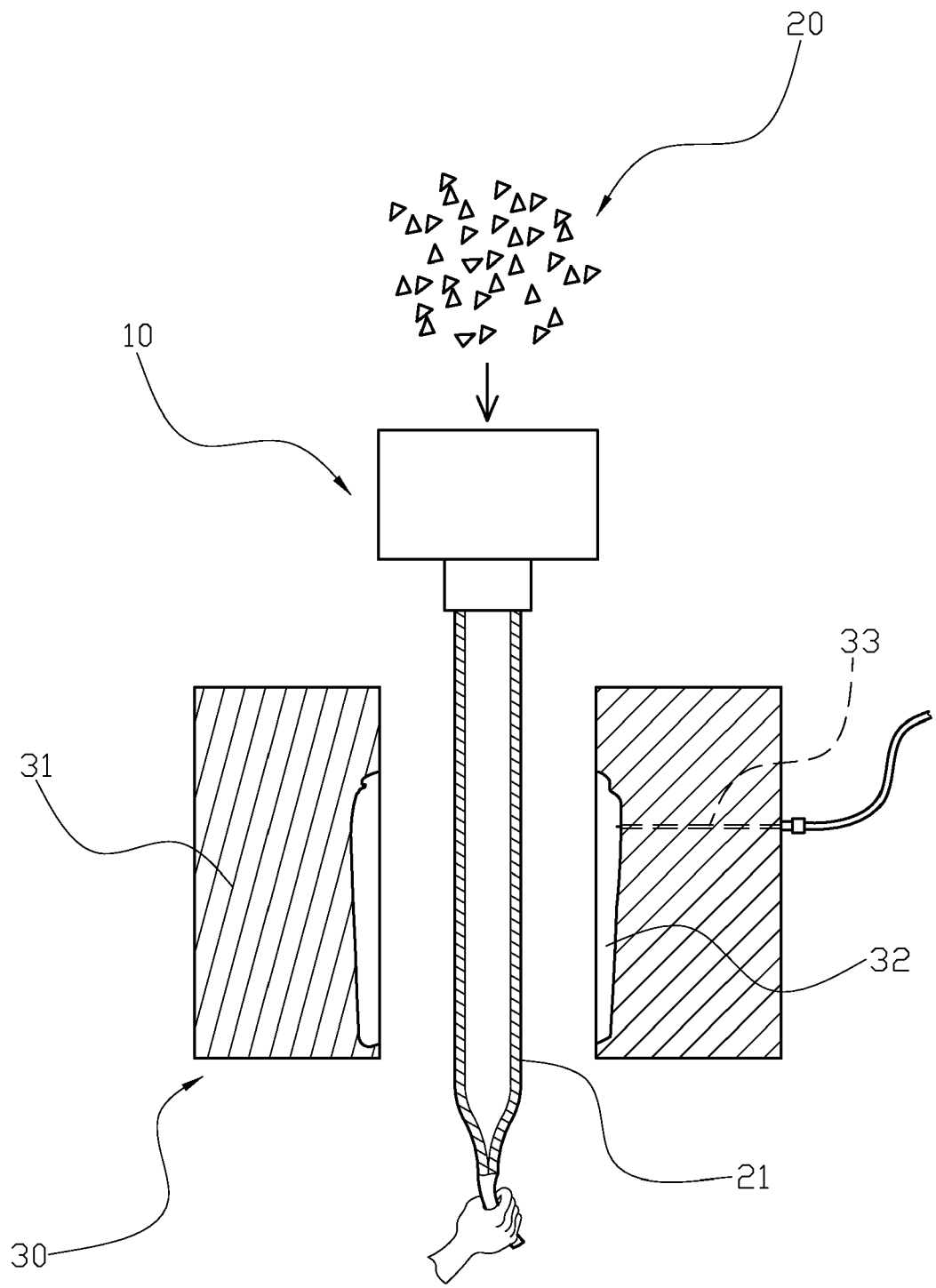
FIG. 2 is a schematic drawing of a blowing and sealing processes of an embodiment of the present invention.

In step (A), as shown in FIG. 2, the thermoplastic material 20 is melted by a blow molding machine 10 and vertically pulls a plastic strip 21 to fill an open first forming mold 30. The first forming mold 30 comprises two matching molds 31 and has an internal first mold cavity 32 and a first blow hole 33 externally reaching into the mold cavity 32. The plastic strip 21 extends below the first forming mold 30 and is cut off by the first forming mold 30.

Figure 3:
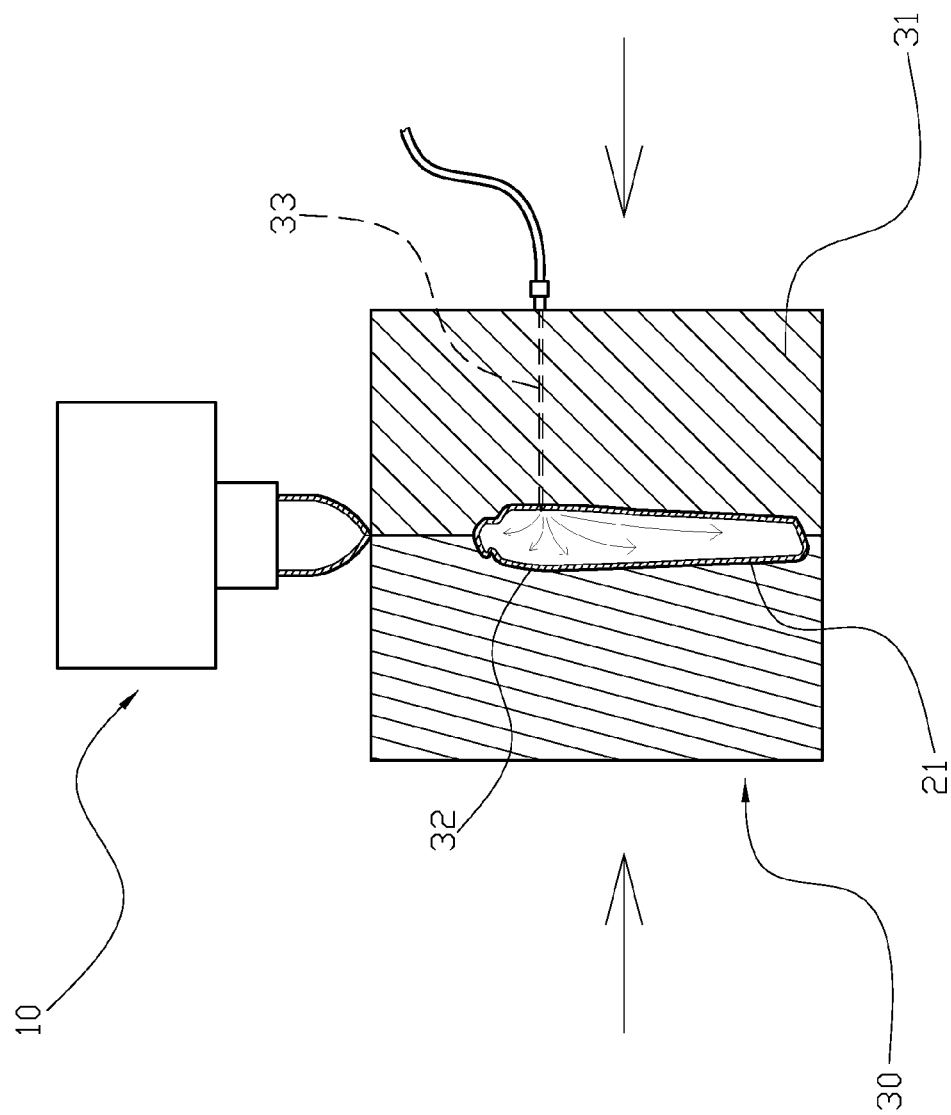
FIG. 3 is a schematic drawing of a mold closing and forming process of an embodiment of the present invention.

In step (B), as shown in FIG. 3, the molds 31 of the first forming mold 30 are closed together to cut off and seal the plastic strip 21 in the first forming mold 30, and one end of the blow hole 33 passes through the plastic strip 21 and is used for blowing the plastic strip 21 to expand the plastic strip 21 to conform to the shape of the mold cavity 32 and form chair legs 40 after a cooling and hardening processes. The blow hole 33 further forms a through hole 41 on the side of the chair legs 40.

Figure 4:
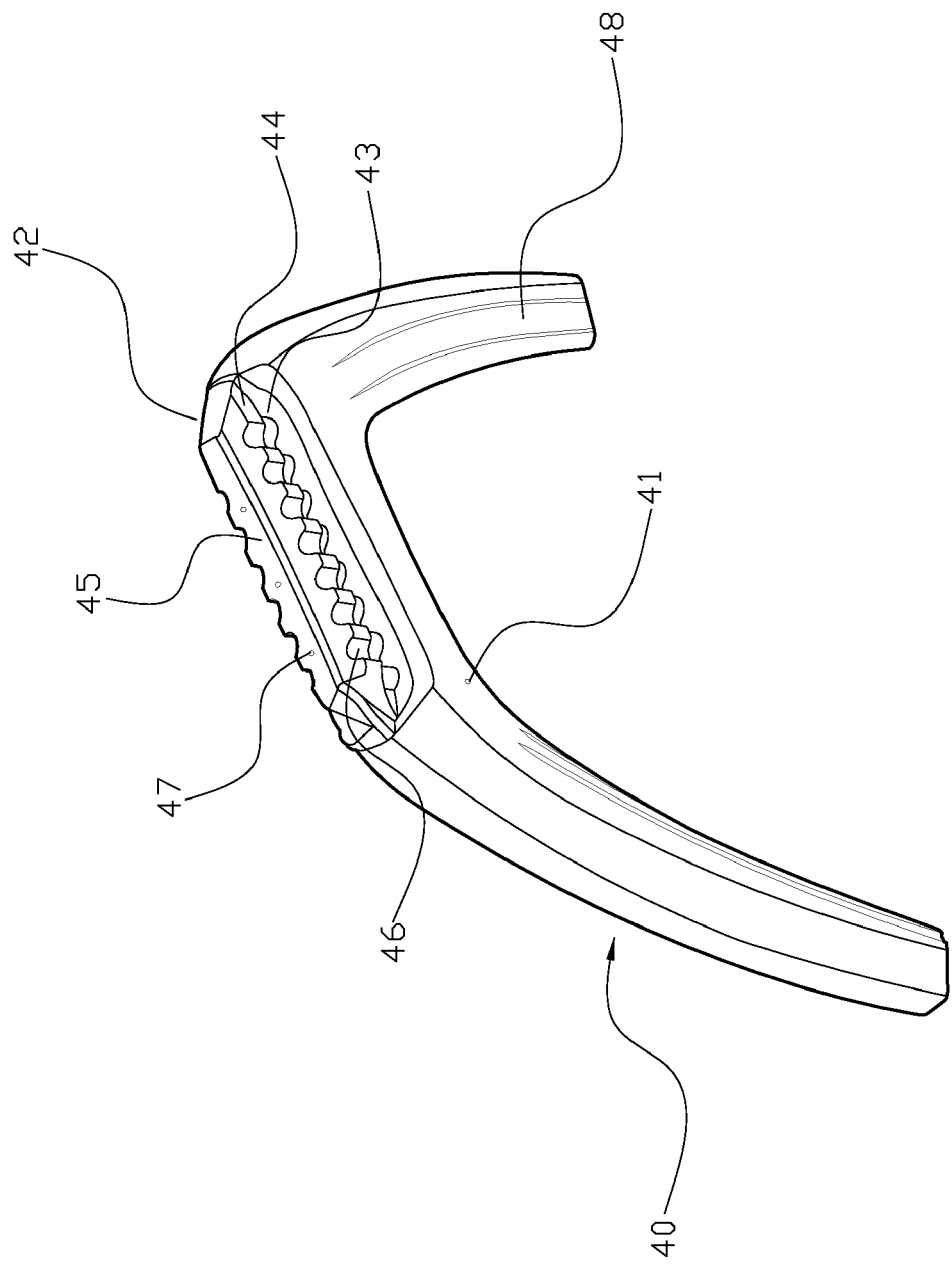
FIG. 4 shows a completed chair legs according to an embodiment of the present invention.

In step (C), as shown in FIG. 4, the chair legs 40 are removed from the first mold 30. The chair legs 40 have an arc shape matching the shape of the mold cavity 32 and a securing portion 42. The securing portion 42 has a relatively smaller raised neck portion 43 on the chair legs 40 and a relatively larger raised strip 44 formed on top of the neck portion 43 with two inclined faces 45 on two sides and an undulating engaging edge 46, and the engaging edge 46 extends onto the neck portion 43. The engaging edge 46 is used to provide increased contact area. During the blowing process, a plurality of dents are formed upon the securing portion 42, and the through apertures 47 are formed on the inclined face 45 by drilling into the dents.

Figure 5:
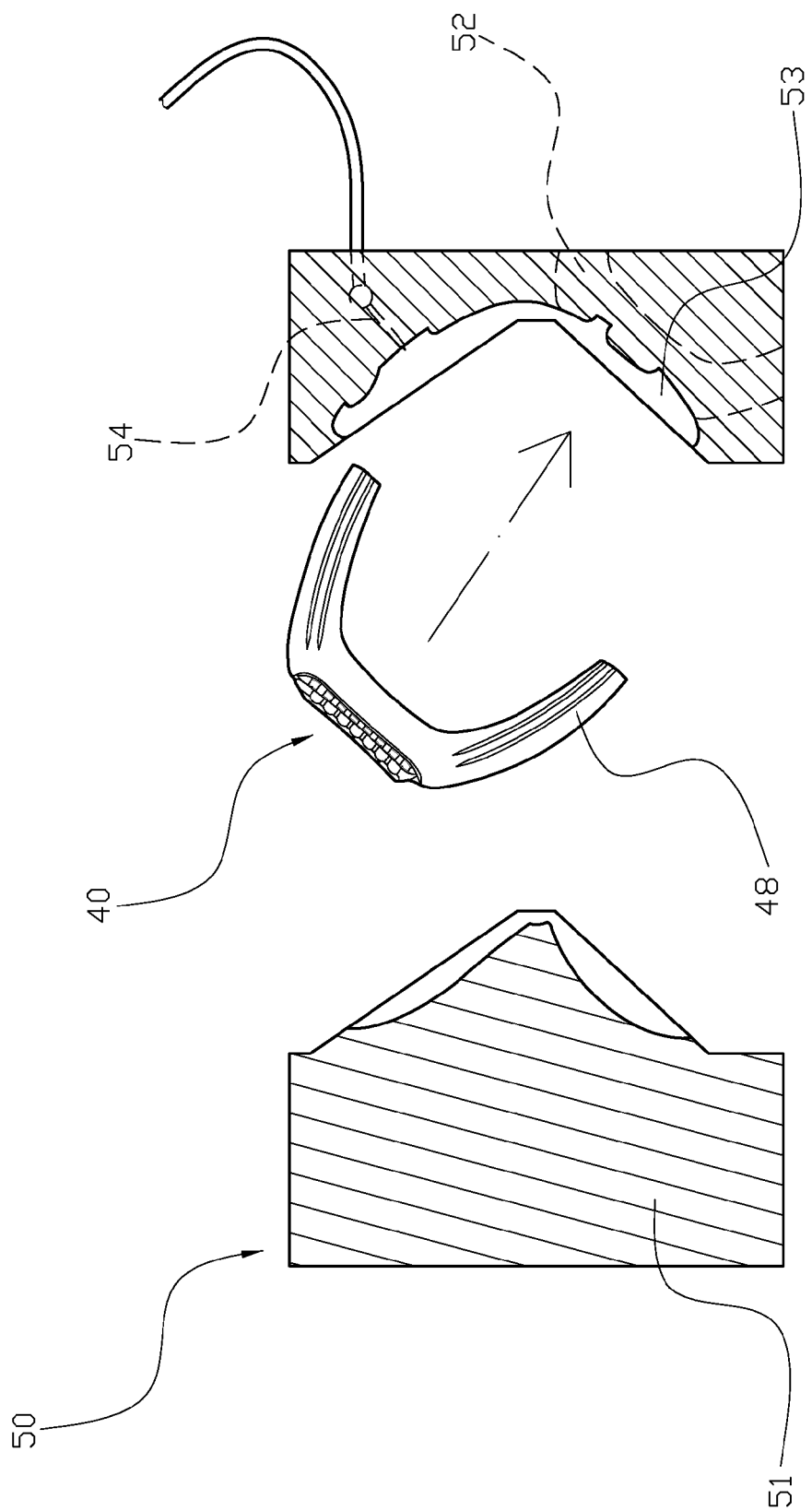
FIG. 5 is a schematic drawing of placing chair legs into a second forming mold according to an embodiment of the present invention.

In step (D), as shown in FIG. 5, the two chair legs 40 are placed into a second forming mold 50. The second forming mold 50 also comprises two matching molds 51, and one of the molds 51 has a space 52 for accepting leg portions 48 of the chair legs 40 such that the chair legs are partially disposed within the mold 51.

Figure 6:
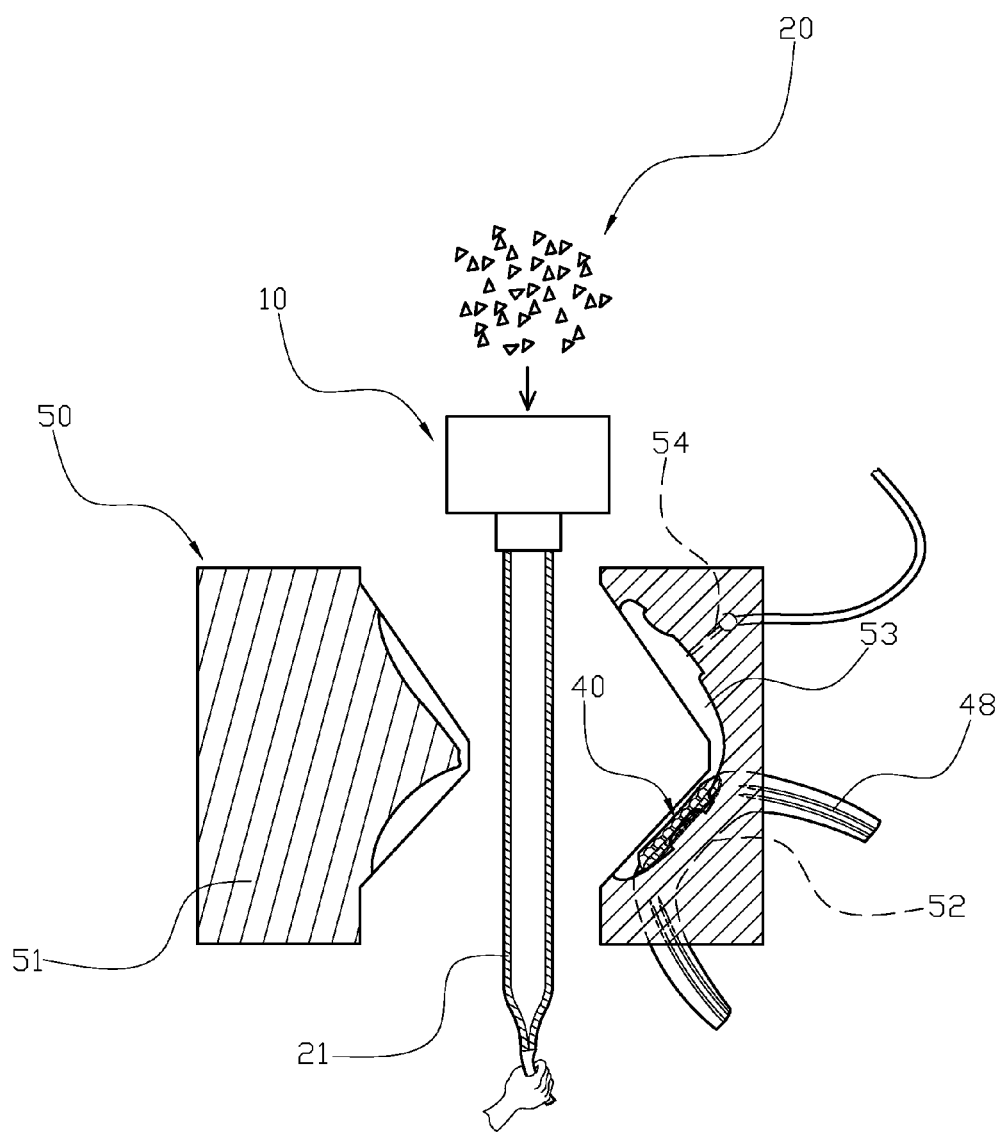
FIG. 6 is a schematic drawing of a second blowing and sealing process according to an embodiment of the present invention.

In step (E), as shown in FIG. 6, the thermoplastic material 20 is melted by the blow molding machine 10 and vertically pulls the plastic strip 21 to fill the second forming mold 50, and the second forming mold also has a second mold cavity 53 and a second blow hole 54. The plastic strip 21 extends below the second forming mold 50 and is cut off by the second forming mold 50.

Figure 7:
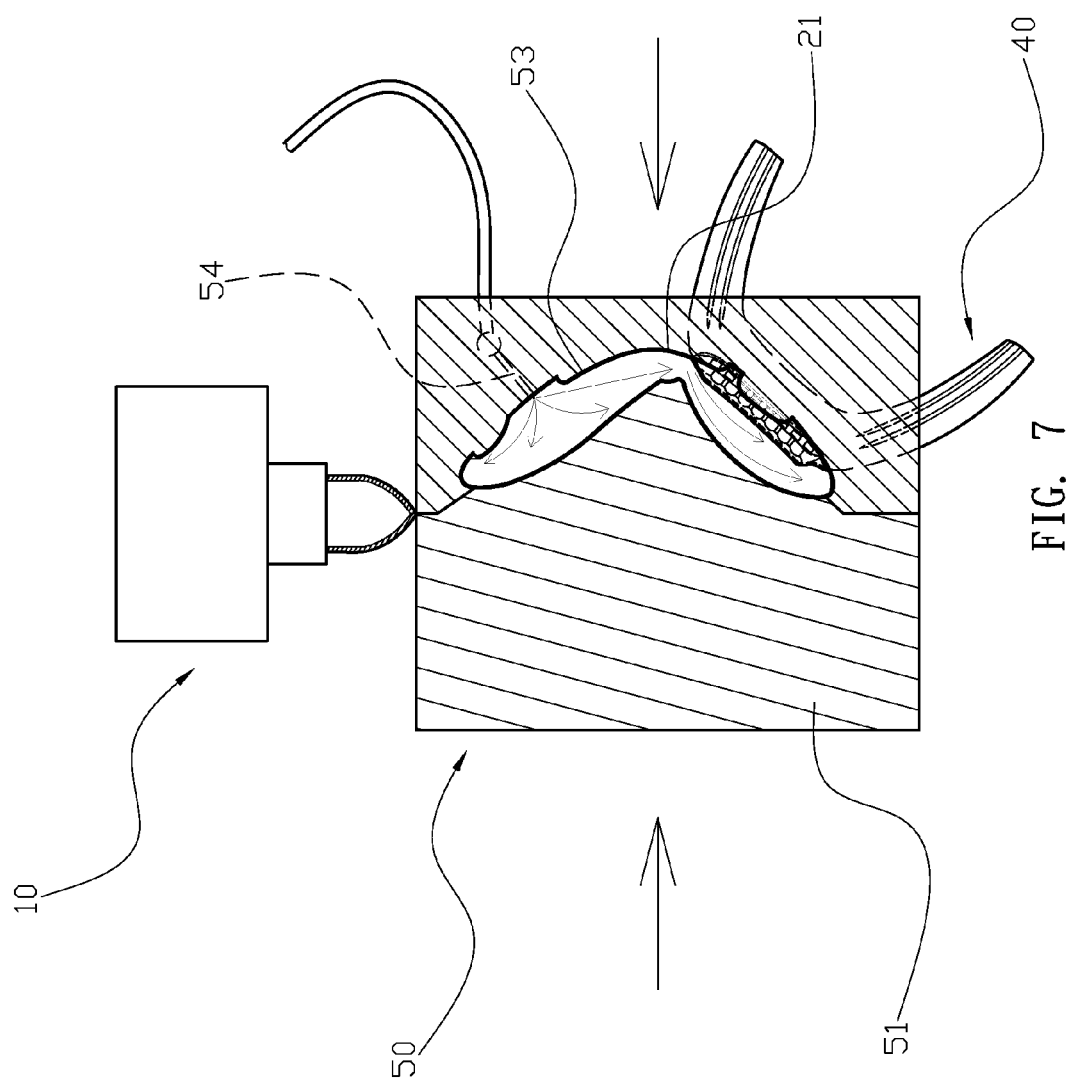
FIG. 7 is a schematic drawing of a mold closing and forming process for a seat according to an embodiment of the present invention.
Figure 8:
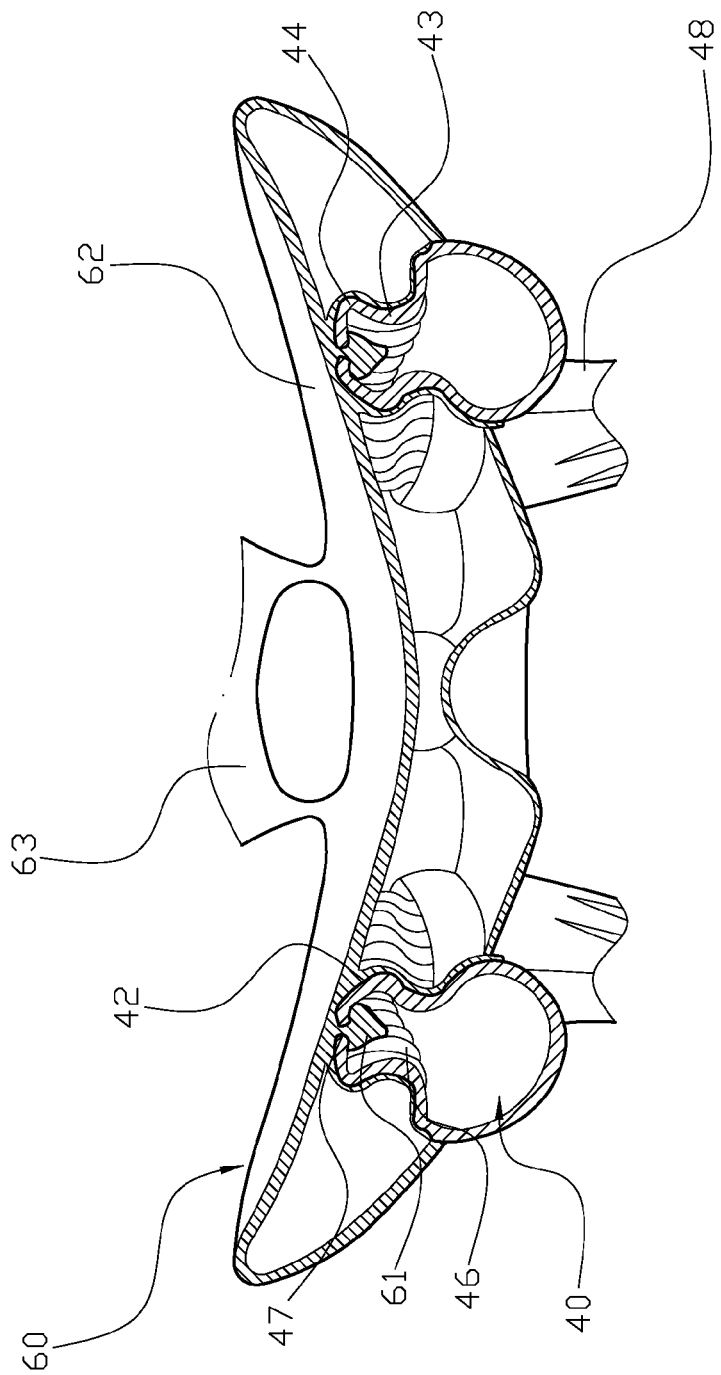
FIG. 8 is a cross-sectional drawing of chair legs and seat according to an embodiment of the present invention.

In step (F), as shown in FIG. 7 and FIG. 8, the molds 51 of the second forming mold 50 are closed together to cut off and seal the plastic strip 21 in the second forming mold 50. One end of the blow hole 54 passes through the plastic strip 21 and is used for blowing the plastic strip 21 to expand the plastic strip to fit the shape of the mold cavity 53 and form a seat 60 after a cooling and hardening process. During the blowing process, the plastic strip 21 completely covers the securing portion of the chair legs 42 and fills up the neck portion 43 (also the engaging edge 46) to provide friction and extra plastic material that permeates the through apertures 47 and expands to form a stop edge 61, such that the seat 60 and the chair legs 40 engage together. When the plastic material permeates into the through apertures 47, the pressure in the chair legs 40 is released by the through hole 41, and the formed seat 60 has both a chair pad 62 and a chair back 63.

Figure 9:
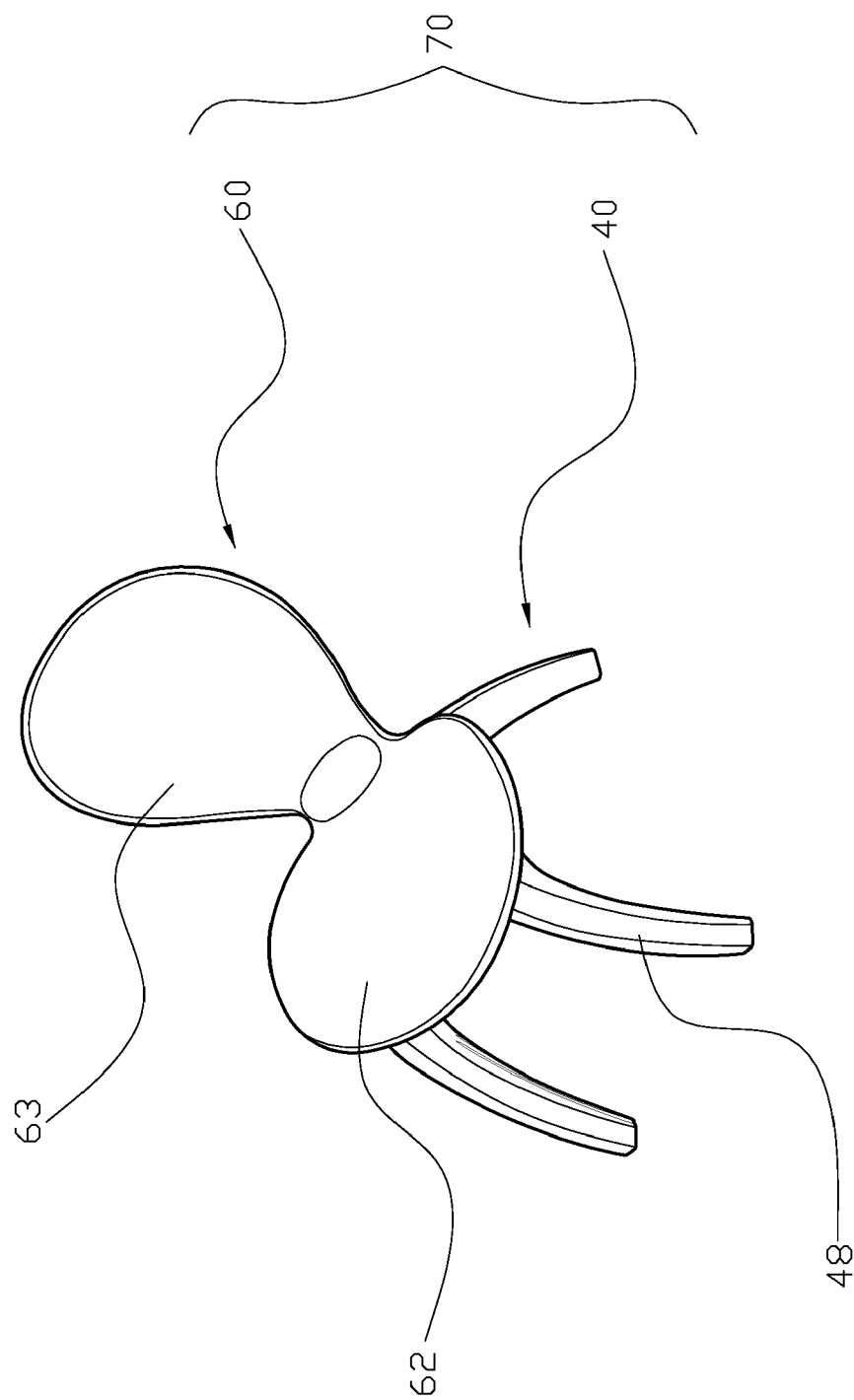
FIG. 9 is a perspective drawing of a chair of an embodiment of the present invention.

In step (G), as shown in FIG. 9, after opening the second forming mold 50, a finished chair 70 is obtained.

Figure 10:
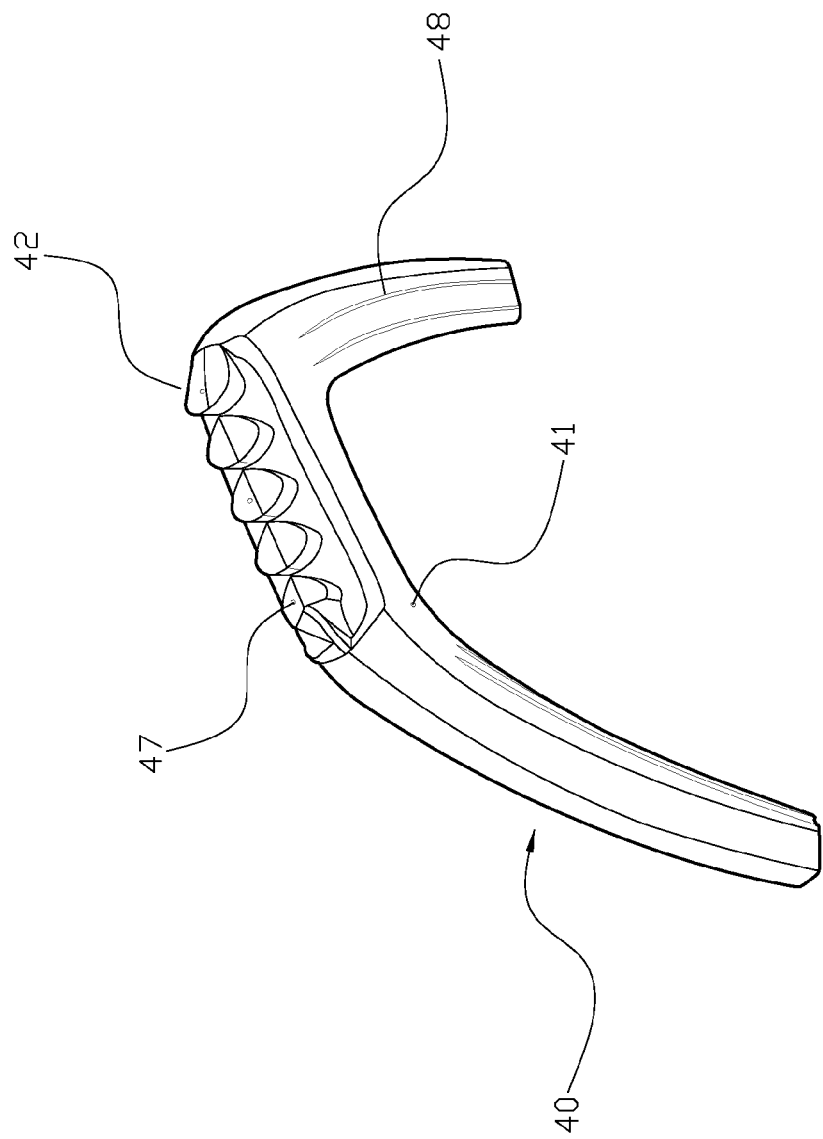
FIG. 10 is a schematic drawing of another embodiment of chair legs according to an embodiment of the present invention.
Figure 11:
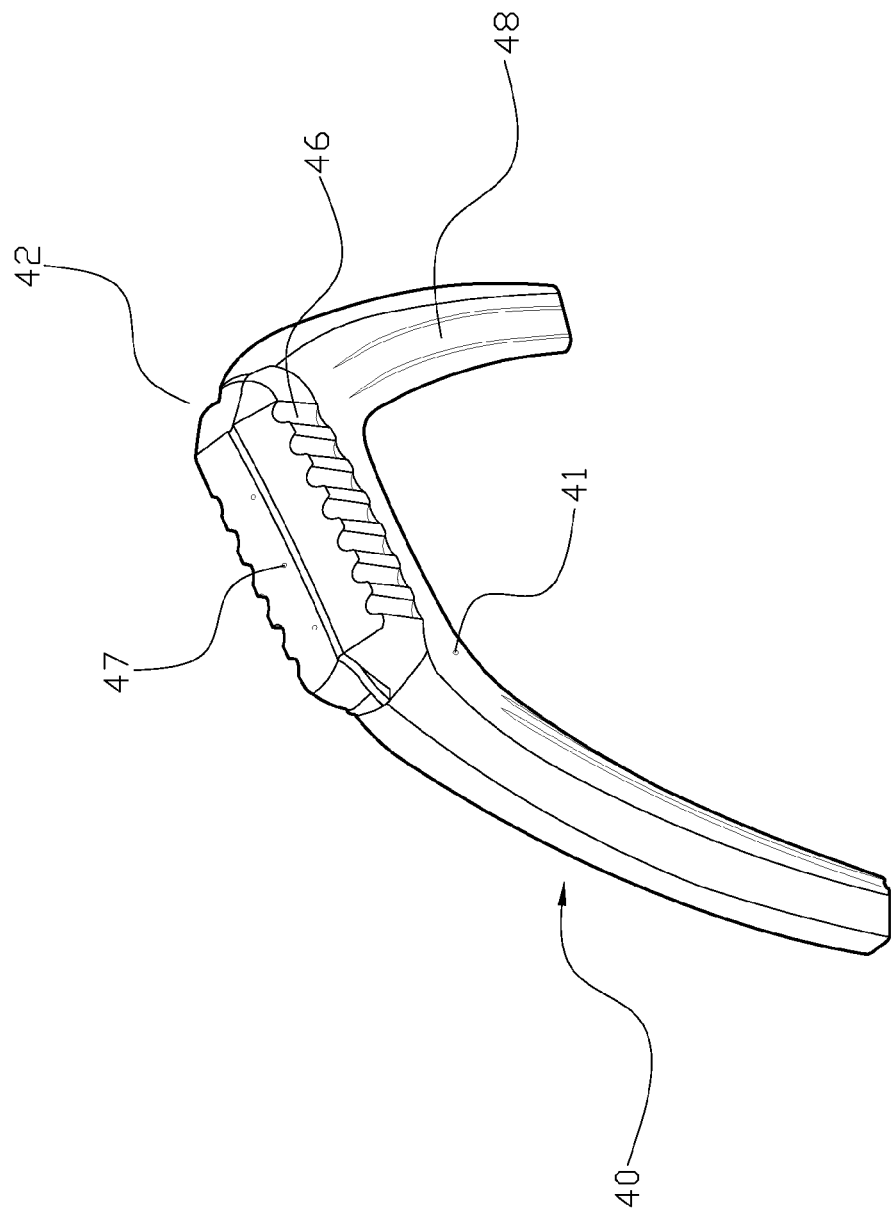
FIG. 11 is a schematic drawing of another embodiment of chair legs according to an embodiment of the present invention.
Figure 12:
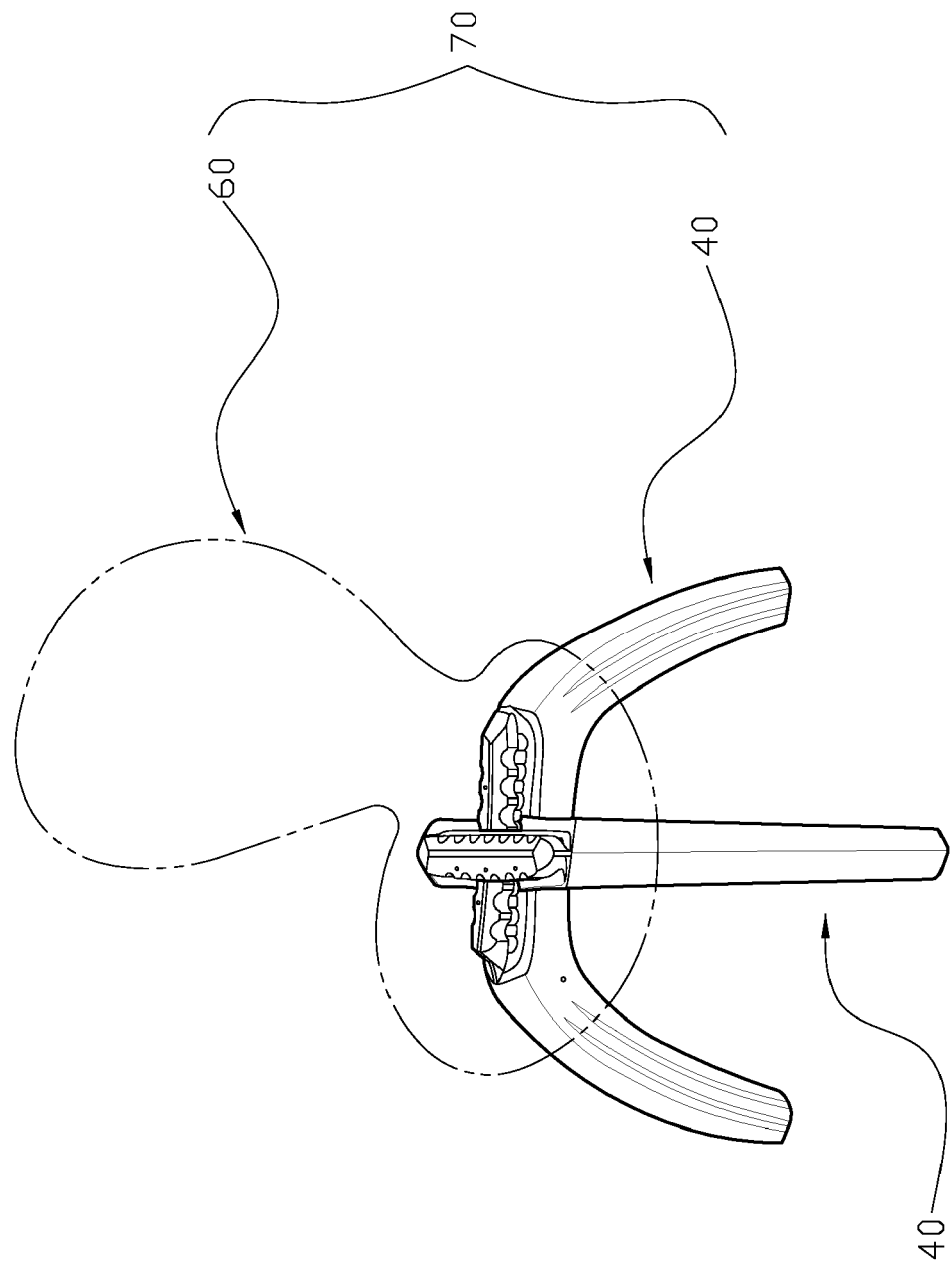
FIG. 12 is a schematic drawing of showing cross placed chair legs according to an embodiment of the present invention.

Please refer to FIG. 10. The securing portion 42 of the chair legs 40 comprises a plurality of triangle-shaped columns which provide gaps in-between for the plastic material to permeate, such that the engaging strength is improved. Alternatively, as shown in FIG. 11, the securing portion 42 may also be enlarged, and the gap between the securing portion 42 and the chair legs 40 allows the plastic material to cover and combine these two. The two chair legs 40 can be placed not just parallel with each other and covered by the seat 60, but may also cross each other as shown in FIG. 12.

With the above mentioned method, the following benefits can be obtained: 1. when the seat 60 is formed, the engagement between the chair legs 40 and the seat 60 is also formed to complete the chair 70; therefore, there is no need for other securing elements and thus manufacturing costs and times are reduced. 2. When the seat 60 is formed, with the stopping edge 61, the chair legs 40 and the seat 60 obtain multiple points of securing strength which makes the chair 70 very durable and worry-free with respect to screws.

Although the present invention has been explained in relation to its preferred embodiment, it is to be understood that many other possible modifications and variations can be made without departing from the spirit and scope of the invention as hereinafter claimed.

What is claimed is:

1. A method for forming a chair comprising:
(A) disposing at least a portion of a first plastic strip into an open first forming mold, the first forming mold defining a first mold cavity for chair legs and having a first blow hole extending into the first mold cavity;
(B) closing the first forming mold and blowing air into the forming mold; wherein molds of the first forming mold are closed together to cut off and seal the first plastic strip in the first forming mold, and an end of the first blow hole passes through the first plastic strip and is used for blowing the first plastic strip to expand the first plastic strip to conform to the shape of the first mold cavity and form the chair legs;
(C) opening the first forming mold and removing the chair legs; wherein the chair legs are removed from the first forming mold, and the chair legs have a securing portion with a plurality of through apertures;
(D) placing at least two of the chair legs into a second forming mold, the second forming mold comprising plural matching molds and defining a second mold cavity for a chair seat and having a second blow hole, at least one of the matching molds having a space for accepting leg portions of the chair legs such that the chair legs are partially disposed within the second mold cavity;
(E) disposing at least a portion of a second plastic strip into the second forming mold; and
(F) closing the second forming mold and blowing air into the second forming mold; wherein the molds of the second forming mold are closed together to cut off and seal the second plastic strip in the second forming mold, an end of the second blow hole passing through the second plastic strip and used for blowing the second plastic strip to expand the second plastic strip to conform to the shape of the second mold cavity and form the chair seat; wherein the second plastic strip covers the securing portion of the chair legs to provide plastic material that permeates into the through apertures to expand to form at least a stop edge, such that the chair seat and the chair legs are engaged together.

2. The method for forming a chair as claimed in claim 1, wherein the first plastic strip extends below the first forming mold and is cut off by the first forming mold.

3. The method for forming a chair as claimed in claim 1, wherein during the blowing process of the chair legs, a plurality of dents are formed upon the securing portion, and the through apertures are formed on an inclined face by protruding into the dents.

4. The method for forming a chair as claimed in claim 1, wherein the second plastic strip extends below the second forming mold and is cut off by the second forming mold.

5. The method for forming a chair as claimed in claim 1, wherein during the formation process of the seat, a chair surface and a chair back are made simultaneously.

6. The method for forming a chair as claimed in claim 1, wherein the securing portion has a relatively smaller raised neck portion on the chair legs and a relatively larger raised strip formed on top of the neck portion with two inclined faces on two sides and an undulating engaging edge, and the engaging edge extends onto the neck portion.

7. The method for forming a chair as claimed in claim 1, wherein the securing portion comprises a plurality of columns.

8. The method for forming a chair as claimed in claim 7, wherein the columns are triangular-shaped.

9. The method for forming a chair as claimed in claim 1, wherein the securing portion has a width that is substantially equal to a width of the chair legs.

10. The method for forming a chair as claimed in claim 1, wherein the chair legs are arc-shaped to provide two legs.

11. The method for forming a chair as claimed in claim 10, wherein the chair legs are parallel to each other and covered and secured by the chair seat.

12. The method for forming a chair as claimed in claim 10, wherein the chair legs cross each other and are covered and secured by the chair seat.

\* \* \* \* \*